United States Patent
Thomas et al.

[11] Patent Number: 5,831,542
[45] Date of Patent: Nov. 3, 1998

[54] AIR SEEDER BLOCKAGE MONITORING SYSTEM

[75] Inventors: John C. Thomas; Douglas L. Hauck, both of Fargo, N. Dak.; Christopher J. Skarie, Audubon, Minn.; Jon T. Jacobson, Fargo, N. Dak.; John D. Paulson, West Fargo, N. Dak.; Trevor D. Fuss, Fargo, N. Dak.; Daryl N. Roehrich, West Fargo, N. Dak.

[73] Assignee: Deere & Company, Moline, Ill.

[21] Appl. No.: 883,853

[22] Filed: Jun. 27, 1997

Related U.S. Application Data

[63] Continuation-in-part of Ser. No. 855,625, May 14, 1997.
[51] Int. Cl.$^6$ .................................................. G08B 21/00
[52] U.S. Cl. ......................... 340/684; 310/345; 340/674
[58] Field of Search .................................. 340/684, 674; 310/345

[56] References Cited

U.S. PATENT DOCUMENTS

| | | |
|---|---|---|
| 4,079,362 | 3/1978 | Grimm et al. . |
| 4,238,790 | 12/1980 | Balogh et al. . |
| 4,441,101 | 4/1984 | Robar . |
| 4,491,241 | 1/1985 | Knepler et al. ......................... 340/684 |
| 5,177,470 | 1/1993 | Repas . |

*Primary Examiner*—Glen Swann
*Attorney, Agent, or Firm*—Arnold international; Bruce Y. Arnold

[57] ABSTRACT

A seed blockage monitoring system employs a flexible, generally flat piezoelectric seed sensor element inserted at an acute angle of about 13 degrees into a seed flow path so that a portion of seeds traveling in the seed flow path strike the seed sensor element, preventing damage to the seeds and maintaining forward momentum of all seeds in the seed flow path. In order to provide flexibility in monitoring seeds of different types and to increase the data rate that information can be obtained from numerous multiple seed sensor elements, the use of a one-shot to temporarily store a seed detection signal and serial sampling of the temporarily stored signals from the sensors as in the prior art is avoided. Instead, a comparator that includes a diode in a feedback loop so as to function as a latch is used in conjunction with a serial shift register that has parallel data input lines. This enables the microprocessor to monitor outputs from one or more sensor elements, or a digital representation thereof, at a higher rate than attainable in the prior art seed blockage monitors. As a result of the increased rate at which information can be obtained from the seed sensor elements, the microprocessor can not only provide seed blockage data but can also provide relative flow data for the various monitored seed flow paths and compute an overall seeding rate.

14 Claims, 11 Drawing Sheets

AIR SEEDER BLOCKAGE MONITORING SYSTEM

CROSS-REFERENCE TO RELATED APPLICATIONS

This is a continuation-in-part of U.S. application No. 08/855,625 filed May 14, 1997, entitled "Method and Circuit for Determining if Seed Sensor is Operably Connected to Seed Monitor System" on behalf of John D. Paulson et al.

BACKGROUND OF THE INVENTION

Prior art seed blockage monitoring systems typically employ a seed flow detector comprising a pin which extends into the seed flow path. The end of the pin is fixed to one face of a ceramic piezoelectric transducer. Seeds flowing in a seed path impact the pin, causing the piezoelectric transducer to undergo a strain. The signals generated by the piezoelectric transducer are detected and interpreted as signals generated by seeds flowing in the seed flow path. Examples of this type of monitoring system are U.S. Pat. No. 5,177,470 to Repas, and U.S. Pat. No. 4,441,101 to Robar. One problem with this type of sensor is that the intrusion of the pin into the seed flow path can itself be the cause of seed flow blockage.

Another type of piezoelectric sensor is disclosed in U.S. Pat. No. 4,238,790. In this patent, a metal plate 16 (FIG. 2) located within a conduit is struck by seeds as they pass down the conduit. The impact of the seeds on the plate strains a piezoelectric crystal to which the plate is affixed, which in turn generates signals indicative of seed flow. A problem associated with this type of sensor is that the striking of the hard metal plate may damage the seeds. Further, because the momentum of the seed must affect the entire mass of the rigid plate before imparting a strain in the piezoelectric crystal, the sensor sensitivity is low.

In U.S. Pat. No. 4,491,241 to Knepler et al., piezoelectric sensors 10, 12 (of undisclosed design) emit an electrical signal when struck by a seed. The electrical signal is input to a one-shot circuit 36 (FIG. 2), which functions as a one-bit memory to store the seed pulse for a period determined by a capacitor 42. A respective sensor circuit 14, 16 (FIG. 1) is coupled intermediate each of the sensors 10, 12 and a common signal line 18. The sensor circuits 14, 16 are coupled in series circuit, with the first sensor circuit 14 connected to an enable line 20 and the last sensor being connected to a termination circuit 17. The common signal line 18 and the enable line 20 are each coupled at one end to a monitoring and control circuit 22. This circuit includes a clock signal generator and a counter. The monitoring and control circuit 22 also drives an alarm indicator 24 (FIG. 11A) and a visual display 26 (FIG. 1) and indicates to the operator when a particular sensor has failed to detect seeds.

In operation, the sensor circuits are enabled sequentially by a signal applied to flip flop 30 (FIG. 2) on enable line 20 from the monitoring and control circuit 22. Flip-flops 30 and 32 operate jointly to enable the gate 34 to pass sensor data from one-shot circuit 36 to common signal line 18 and, as well, to generate an enabling signal to the next sensor circuit in the series connection after the initial interrogation of the gate 34. If, at the time the one-shot circuit 36 is interrogated, the output therefrom indicates that seeds are being dispensed, a logic 1 signal is placed on the common signal line 18. If no seeds are being dispensed, a signal level intermediate a logic 1 and a logic 0 is placed on the common signal line 18. The monitoring and control circuit discerns the intermediate level signal and displays that a seed dispensing fault has occurred at a particular sensor location indicated on a counter 98 (FIG. 3A).

Upon the last sensor in the series connection being interrogated, the termination circuit 17 receives the enable signal, which has been passed along from one sensor circuit to the next in bucket brigade fashion as each is interrogated. The termination circuit, in response to receiving the enable signal, places a logic 0 on the common signal line 18. The logic 0 on the common signal line 18 causes the monitoring and control circuit 22 to reset the counter 98. Should a failure occur in the termination circuit 17 or related components, the counter will continue to count upwardly, thus triggering a failure signal and an alarm.

One disadvantage with the system disclosed in Knepler et al is that, once the one-shot has detected a seed being dispensed, another seed can not be detected until the one-shot has reset itself. As the period of each one-shot is determined by the value of the capacitor 42, this period can not readily be adjusted.

In the embodiment illustrated in FIG. 6 of Knepler et al, a microprocessor is employed to scan the circuits 14,16, etc. at a preferred rate of 10 kHz (see column 11, line 31). This overcomes a delay in scanning encountered when using the prior embodiment. In that embodiment, when a failure signal is detected, scanning is suspended from one-half to one second while a display of the number of the failed unit is activated (see column 10, line 23).

Although use of a microprocessor allows more rapid scanning of the sensor circuits 14,16, etc., the fundamental limitations of the circuitry, as discussed above, still exist. Thus, even in this embodiment the one-shot retains the seed strike information for approximately 34 ms (see column 16, line 41). Therefore, increasing rate of the interrogation beyond about 30 times per second (the inverse of 34 ms) accomplishes nothing, since there is no new information to be obtained until the one-shots have reset themselves.

Another disadvantage of the circuitry in Knepler et al is that a termination circuit 17 is required to make the system operable; should the termination circuit 17 fail, the entire system becomes inoperable.

A final disadvantage of all the prior art seed blockage monitoring systems known to applicant is that the piezoelectric elements are ceramic elements. The ceramic element undergoes a strain when a hard surface or pin that is attached to the ceramic element is struck by a seed. This has the disadvantages of the seed possibly being damaged by striking the hard surface or pin, and the sensing not being as sensitive as it could otherwise be. Since the entire mass of the rigid pin or plate must be affected before causing a strain (i.e., output signal) in the piezoelectric element, the sensitivity is reduced. For this reason, the prior art systems are not well adapted to detecting very small seeds.

Also, the prior art seed blockage monitoring systems are subject to error resulting from induced noise, as may result from static charge buildup/discharge on the seed planter equipment or from other induced voltages resulting from electromagnetic fields.

Finally, the prior art seed blockage monitoring systems are not easily adapted to different seed monitoring configurations. For instance, it may be desired to operate with only one sensor connected per header (one example of what will be called herein as a "partial-run" configuration) in order to monitor for a primary seed tube blockage, thereby reducing the overall cost of the seed blockage monitoring system to a minimum. Or, it may be desired to operate with each secondary seed tube having its own sensor (herein termed a "full-run" configuration) so as to be able to monitor blockage of all the primary and secondary seed tubes. Prior art seed blockage monitoring systems are not well-suited to operating in both a "partial-run" and a "full-run" seeding operation.

BRIEF SUMMARY OF THE INVENTION

A first object of the present invention is to provide a piezoelectric sensor element that is relatively soft and pliable rather than rigid, so that seeds are not damaged when they impact onto the sensor and so that the sensor is more sensitive, thus enabling smaller seeds to be detected by requiring less momentum transfer in order to detect a seed.

A second object of the invention is to minimize the intrusion into the seed flow path by the sensor. This is accomplished in part by the design of the sensor, which makes it more sensitive, and in part by the manner in which the sensor is mounted in the seed flow path. The decrease of the intrusion of the sensor into the seed flow path has two advantages. It reduces the possibility that seeds will be damaged as they strike the sensor, and almost eliminates the possibility that a sensor element will cause a seed flow blockage.

A third object of the invention is to increase the rate that information may be obtained from the piezoelectric seed sensors, thereby enabling a seed blockage monitor to also provide information as to the actual number of seeds flowing in the various monitored seed flow paths as well as information as to the relative rates of seed flow.

A fourth object of the invention is to eliminate the need to employ a termination circuit 17 as employed in U.S. Pat. No. 4,491,241.

A fifth object of the invention is to provide circuitry wherein the memory period of a seed event can be readily adjusted.

A sixth object of the invention is to provide circuitry wherein data from multiple seed sensor memory units can be simultaneously read and reset, thereby enabling higher data rates to be achieved than in the prior art.

A seventh object of the invention is to decrease the possibility that discharges from static build-up, or from other electromagnetic fields, may affect the operation or accuracy of the seed blockage monitor.

The present invention will be more fully understood from the detailed description and accompanying drawings, which are given by way of illustration only, and thus, are not limitative of the invention.

DETAILED DESCRIPTION

The disclosures of the parent applications mentioned under the heading "Cross Reference to Related Applications" are hereby incorporated by reference.

Figure 1:
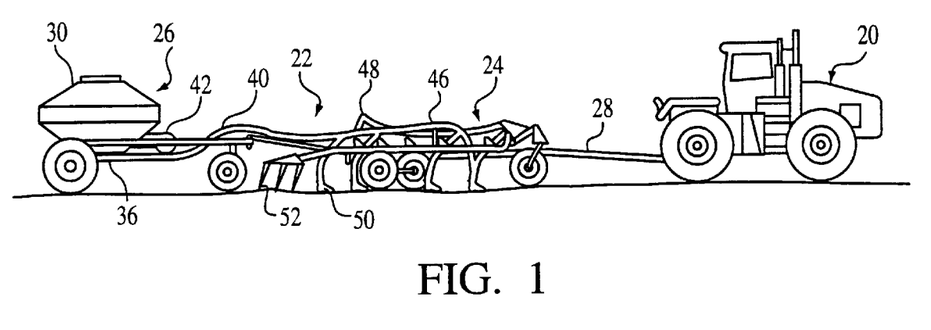
FIG. 1 is a side view of a tractor towing an air seeding system including a blockage monitoring system according to an embodiment of the present invention.

FIG. 1 shows a side view of a tractor 20 intended to represent various types of farm tractors that perform various tasks in a high volume agricultural environment as may be present on a farm. In the depiction of FIG. 1, the tractor 20 is towing an air seeding system 22, including a tool bar 24 and an air cart 26, by a tow bar 28. The air seeding system 22 can be any known air seeding system, such as the 735 Air Seeder and 737 Air Hoe Drill, both available from the John Deere Company.

The tool bar 24 creates multiple parallel furrows in the soil of a field area to be planted, dispenses a controlled quantity of seeds into the furrows, and then covers the furrows in a manner that allows the seeds to germinate and then become plants. Known air seeding systems such as the air seeding system 22 can simultaneously plant up to ninety-six rows of seeds. The configuration of the tool bar 24 and the air cart 26 can be reversed in that the tractor 20 can tow the air cart 26 and the air cart 26 can tow the tool bar 24.

Figure 2:
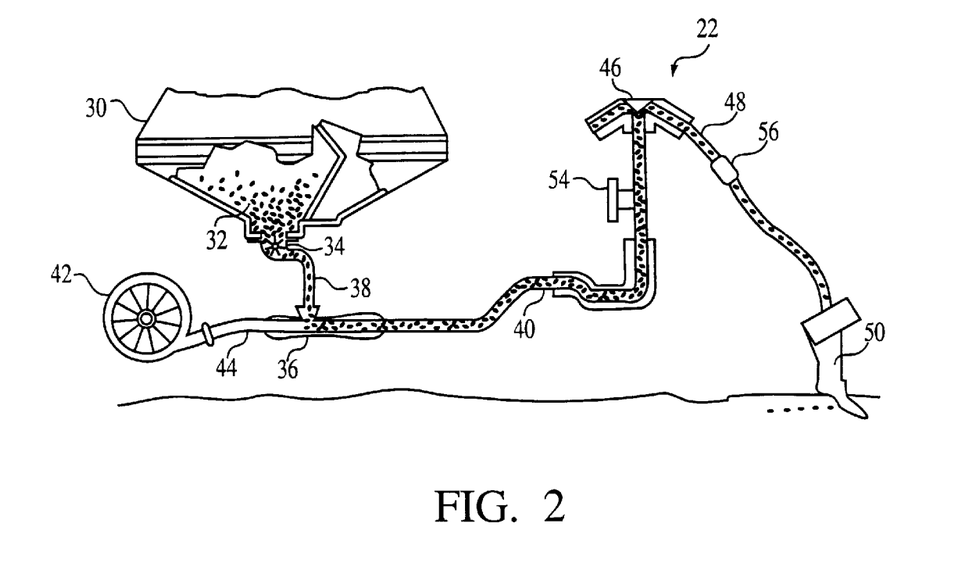
FIG. 2 is a cut-away side view of the blockage monitoring system of the present invention in association with the air seeding system of FIG. 1.

FIG. 2 shows a cut-away, side view of a portion of the air seeding system 22. The air cart 26 (FIG. 1) includes a hopper 30 that holds a quantity of a particulate matter to be dispensed by the air seeding system 22. The hopper 30 can hold any particulate matter for the purposes described herein, such as various grains, seeds, fertilizers, and herbicides. For the purposes of this discussion, the air seeding system 22 will be described as dispensing seeds 32 of any suitable type. The flow of seeds 32 from the hopper 30 is controlled by a rotary metering system 34. The controlled flow of seeds 32 from the metering system 34 distributes the seeds 32 into a primary manifold 36 through a suitable conduit 38. A plurality of primary seed tubes 40, one of which is shown in FIG. 2, are connected to the primary manifold 36 to receive the flow of seeds 32 from the hopper 30. For the embodiment of the air seeding system that seeds ninety-six rows, there would be eight primary seed tubes 40.

A fan 42 is connected to the primary manifold 36 by a hose 44. The fan 42 provides air pressure to the primary manifold 36 so as to cause the seeds 32 to move through the primary manifold 36 into the primary seed tubes 40 under air pressure. Each primary seed tube 40 is connected to a separate secondary manifold, commonly referred to as a header 46. A plurality of secondary seed tubes 48 are connected to each of the headers 46. In the embodiment being discussed herein, there are twelve secondary seed tubes 48 connected to each header 46. Each secondary seed tube 48 is connected to an opener 50. The opener 50 can be a blade device that creates furrows in the soil being planted from the motion of the tool bar 24 such that the seeds 32 are dispensed from the opener 50 at the appropriate depth into the soil. Ground closers 52, depicted in FIG. 1, then close the furrows to cover the seeds 32 with soil.

A blockage monitor unit 54, is attached to the tool bar 24 in close proximity to one of the headers 46. A blockage sensor unit 56 is attached to the secondary seed tube 48.

Figure 3:
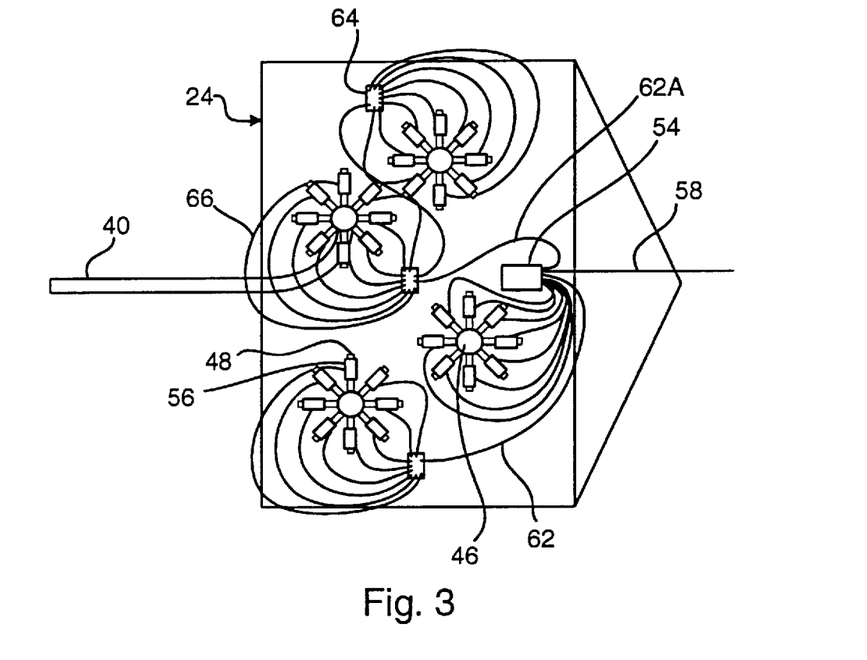
FIG. 3 shows a top view of a "full-run" air seeder blockage monitoring system.

One preferred embodiment of the air seeder blockage monitoring system, referred to as a "full-run" air seeder blockage monitoring system, is depicted in FIG. 3. A "full-run" air seeder blockage monitoring system is defined as one in which every connected secondary seed tube 48 in the system is fitted with an individual blockage sensor unit 56, such that blockage can be detected if it occurs in any of the primary seed tubes 40 or in any of the secondary seed tubes 48 which are connected to the system.

FIG. 3 shows a top view diagram of the "full-run" air seeder blockage monitoring system. For clarity, the diagram has been simplified such that elements of the system which can be plural in nature may appear in singular or in a limited representation of their true number. The seeds 32 are carried by a plurality of primary seed tubes 40 to a number of headers 46, located on the tool bar 24. The headers 46 distribute the seeds 32 through a plurality of secondary seed tubes 48 (e.g., twelve secondary seed tubes per header). Blockage sensor units 56 are inserted in the secondary seed tubes 48.

The processing hardware for the "full-run" air seeder blockage monitoring system is located within the blockage monitor unit 54. The blockage monitor unit 54 is housed in a rugged enclosure (e.g., John Deere wedge box) and contains a microprocessor 60 (not shown in FIG. 3) or other signal processing means by which to analyze sensor data. The blockage monitor unit 54 is linked to a display area by a common data bus 58, such as CAN or SAE J1850B. Two serial interface links 62 and 62A are used to send signals and receive data from auxiliary data collection units, referred to as slave units 64. The serial interface links 62 and 62A are four wire interconnects that link a plurality of slave units 64 with the blockage monitor unit 54 in a serial manner (referred to hereinafter as a daisy chain configuration).

Figure 4:
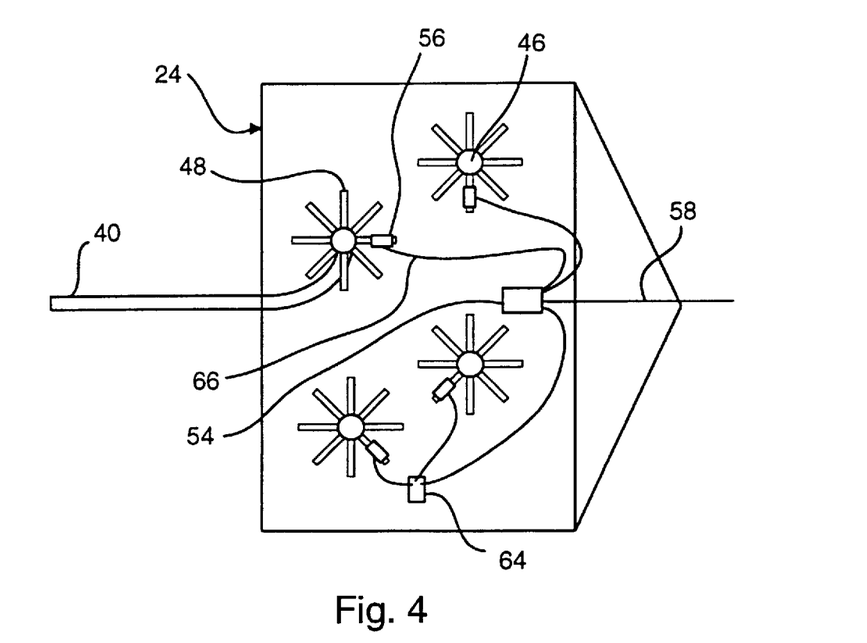
FIG. 4 shows a top view of a "partial-run" air seeder blockage monitoring system.

Each header 46 in the "full-run" air seeder blockage monitoring system (other than the header monitored by the blockage monitor unit 54) may be equipped with one slave unit 64, such that all of the blockage sensor units 56 associated with the secondary seed tubes 48 for a particular header 46 are interfaced to the associated slave unit 64 by suitable sensor wire cable harnessing 66 (e.g., 22 AWG stranded, twisted pair with PVC insulation). Or, as illustrated in FIGS. 3 and 4, one or more blockage sensor units 56 may be connected directly to the blockage monitor unit 54. In this case, the blockage sensor units 56 connected to the blockage monitor unit 54 are interfaced through the sensor interface circuit 162 (FIG. 12) to digital inputs of the microprocessor 60. In an alternative embodiment, the analog sensor signals of the directly-connected sensor units 56 are input to analog inputs of the microprocessor 60.

The main harnessing that provides power to monitor unit 54 also contains sensor wire cable harnessing 66, allowing it to connect directly to a plurality of blockage sensor units 56 associated with the secondary seed tubes 48 of one of the headers 46.

Each slave unit 64 is housed in a special enclosure (FIG. 10) which includes within the enclosure circuitry (FIG. 12) which filters, amplifies, and converts analog signals received from the blockage sensor units 56 into a digital format. The digital format signals from various blockage sensor units 56 are then serially transmitted to the blockage monitor unit 54 (FIG. 11) by using a serial shift register having parallel data input ports.

An alternate, cost-reduced embodiment of the air seeder blockage monitoring system, referred to as a "partial-run" air seeder blockage monitoring system, is depicted in FIG. 4. A "partial-run" air seeder blockage monitoring system is defined as one which has been mainly designed to detect blockage of the primary seed tubes 40.

FIG. 4 shows a top view diagram of one example of a "partial-run" air seeder blockage monitoring system. For clarity, the diagram has been simplified, such that elements of the system which can be plural in nature may appear in singular or in a limited representation of their true number. The seeds 32 are carried by a plurality of primary seed tubes 40 to a number of headers 46, located on the tool bar 24. The headers 46 distribute the seeds 32 through a plurality of secondary seed tubes 48 (e.g., twelve secondary seed tubes per header). Blockage sensor units 56 are inserted in a representative sample set of the secondary seed tubes 48 associated with each header 46 (e.g., one blockage sensor unit per header).

The processing hardware and software for the "partial-run" air seeder blockage monitoring system is located within the blockage monitor unit 54. The blockage monitor unit 54 is housed in a rugged enclosure (e.g., John Deere wedge box) and contains a microprocessor 60 (not shown in FIG. 4) or other signal processing means by which to analyze sensor data. The blockage monitor unit 54 is linked to a display area by a common data bus 58, such as CAN or SAE J1850B. Two serial interface links 62 and 62A are used to send signals and receive data from auxiliary data collection units, referred to as slave units 64. The serial interface links 62 and 62A are four-wire interconnects that link a plurality of slave units 64 with the blockage monitor unit 54 in a daisy chain configuration.

In FIG. 4, blockage sensor units 56 attached to one secondary seed tube 48 on each of two headers 46 in the "partial-run" air seeder blockage monitoring system can be linked to one slave unit 64, by suitable sensor wire cable harnessing 66 (e.g., 22 AWG stranded, twisted pair with PVC insulation). The slave unit 64 is housed in a special enclosure (FIG. 10) that includes circuitry which filters, amplifies, and converts analog signals received from the blockage sensor units 56 into a digital format which is then serially transmitted to the blockage monitor unit 54. The blockage monitor unit 54 also contains sensor wire cable harnessing 66, allowing it to connect to a sample set of blockage sensor units 56 associated with the secondary seed tubes 48 of two of the headers 46. Those blockage sensor units 56 that are directly connected to the blockage monitor unit 54 are connected through the sensor interface circuit 162 (FIG. 12) to the microprocessor 60.

For "partial-run" systems, it should be noted that other configurations of electronic control box arrangements are feasible. For example: all sensors 56 could plug into the blockage monitor unit 54, thus obviating the need for any slaves; or, more than two sensors could be plugged into the blockage monitor unit 54 and each slave unit 64.

Figure 5:
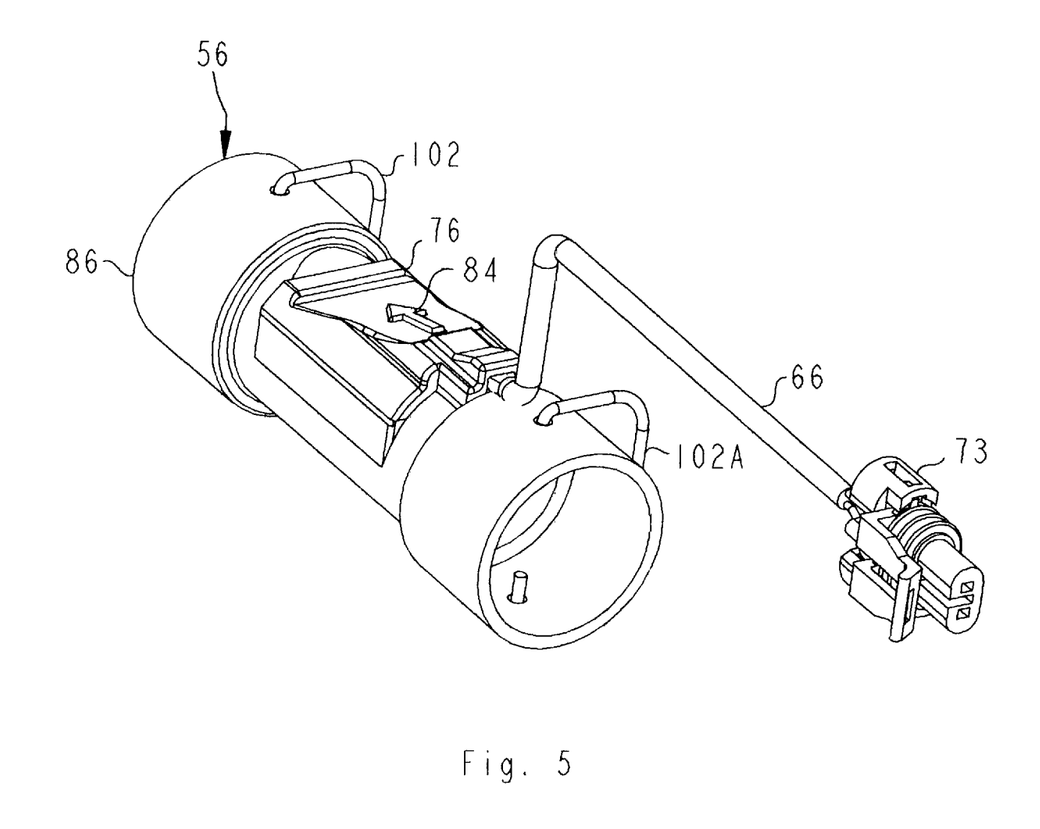
FIG. 5 is a perspective view of a fully assembled blockage sensor unit.
Figure 6:
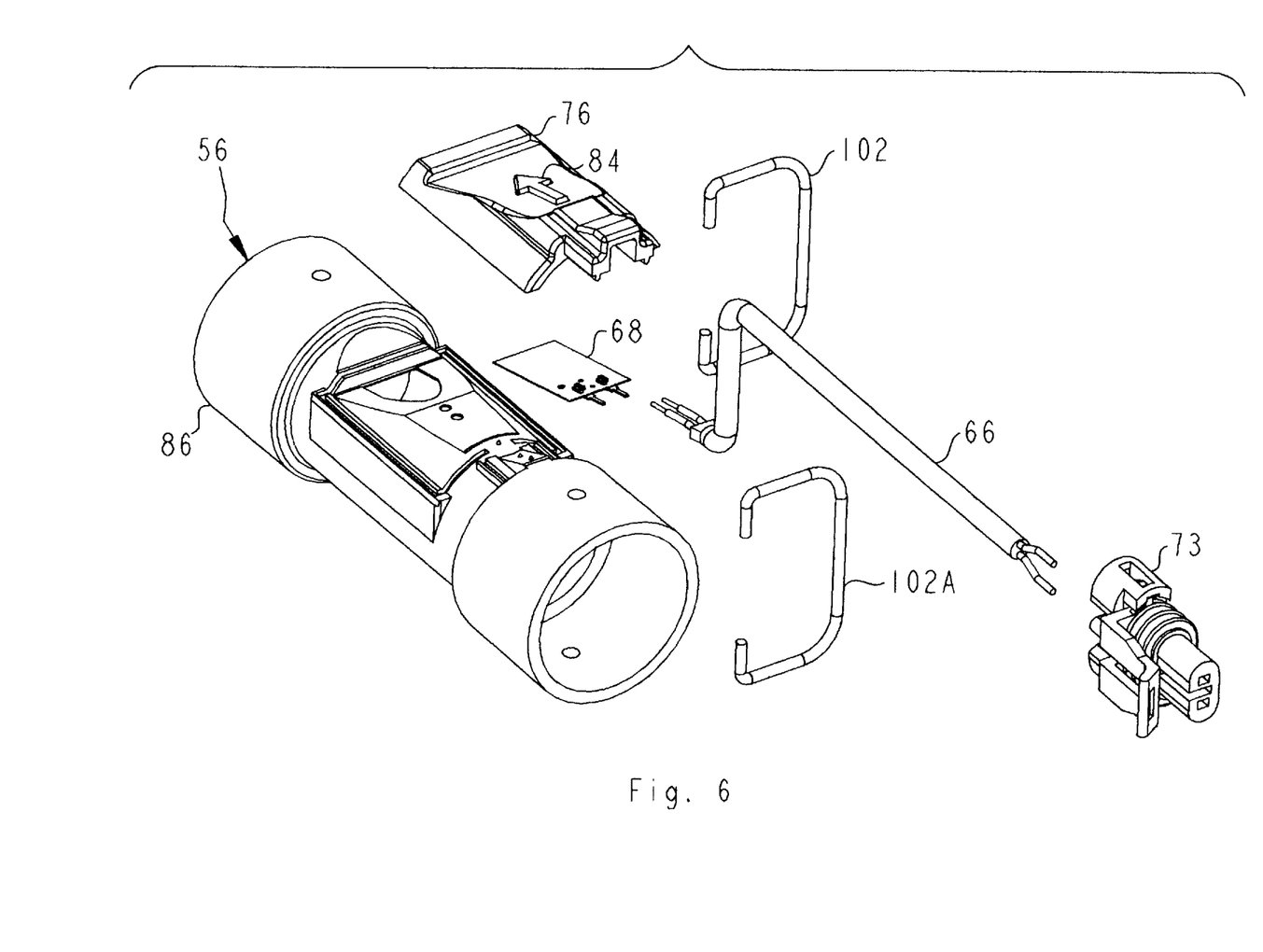
FIG. 6 shows an exploded view of the blockage sensor unit of FIG. 5.

FIG. 5 shows an isometric view of the fully assembled blockage sensor unit 56 and FIG. 6 shows an exploded view of the blockage sensor unit 56. In this embodiment of the blockage sensor unit 56, seeds 32 pass through a secondary seed tube 48 and enter the blockage sensor unit 56. Some of the seeds 32 impinge on a flexible piezoelectric sensor element 68, such as piezoelectric film. When a seed 32 impinges on the flexible piezoelectric sensor element 68, the piezoelectric effect generates a voltage, which is transmitted either to one of the slave units 64 and then to the blockage monitor unit 54, or to the blockage monitor unit 54 directly, and is interpreted as a "seed event".

Figure 7A:
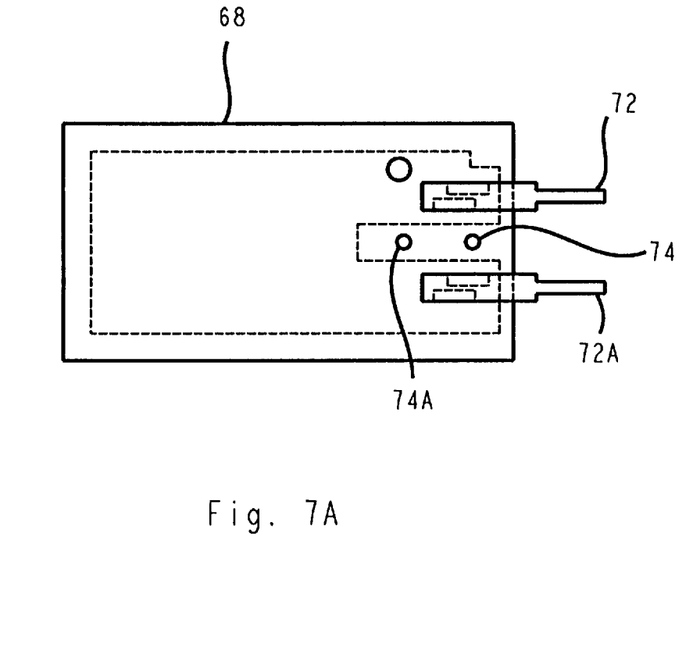
FIG. 7A is a view of the top of a flexible piezoelectric sensor element used in the invention.
Figure 7B:
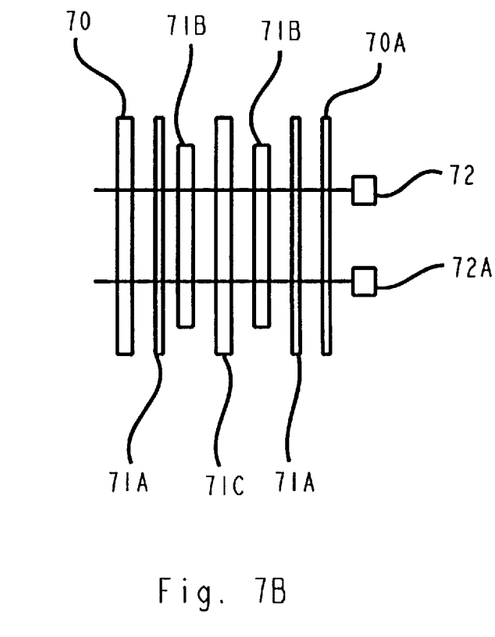
FIG. 7B is an exploded side view of the same sensor element as shown in FIG. 7A.

The flexible piezoelectric sensor element 68 in (FIG. 7A) is commercially available from AMP Incorporated. As shown in the exploded, side view of FIG. 7B, MYLAR sheeting 70, 70A sandwiches silk-screened, silver ink layers 71B and silk-screened piezoelectric material 71C, with layers 71A being adhesive layers. A second piece of MYLAR sheeting 70A is bonded in place over the top of the piezoelectric material to act as a flexible protective covering. Two solder-type connectors 72 and 72A are crimped into place at the base of the flexible piezoelectric sensor element 68 and connected to suitable sensor wire cable harnessing 66 (e.g., 22 AWG stranded, twisted pair with PVC insulation) equipped with a connector body 73 (such as connectors commercially available from Packard Delphi) having female terminals. Alignment holes 74 and 74A insure that the flexible piezoelectric sensor element 60 is aligned correctly when it is installed into a blockage sensor cover 76 (shown in detail in FIGS. 8A–8C).

The blockage sensor cover 76 can be made of an injection molded thermoplastic material such as a polycarbonate/ABS blend. The flexible piezoelectric sensor element 68 (FIG. 7A) is designed such that the alignment holes 74 and 74A fit directly over alignment pins 78 and 78A (shown in cross-section in FIG. 8B) in the blockage sensor cover 76. This allows the sensing area of the flexible piezoelectric sensor element 68 to be aligned directly upon the angled portion of the blockage sensor cover 76, referred to as an angle of intrusion α. The illustrated angle α is an angle of approximately, but not limited to, thirteen degrees. (This angle, illustrated in FIG. 9B, may alternatively be measured from the intrusion surface normal to a direction that is normal to the flow axis of seeds in blockage sensor unit 56. A thirteen degree angle of intrusion reduces the cross-sectional area of the secondary seed tube 48 by no more than seven percent, yet allows seeds 32 to effectively impact the flexible piezoelectric sensor element 68 while not being slowed significantly in their travel along the seed tube.

Figure 8A:
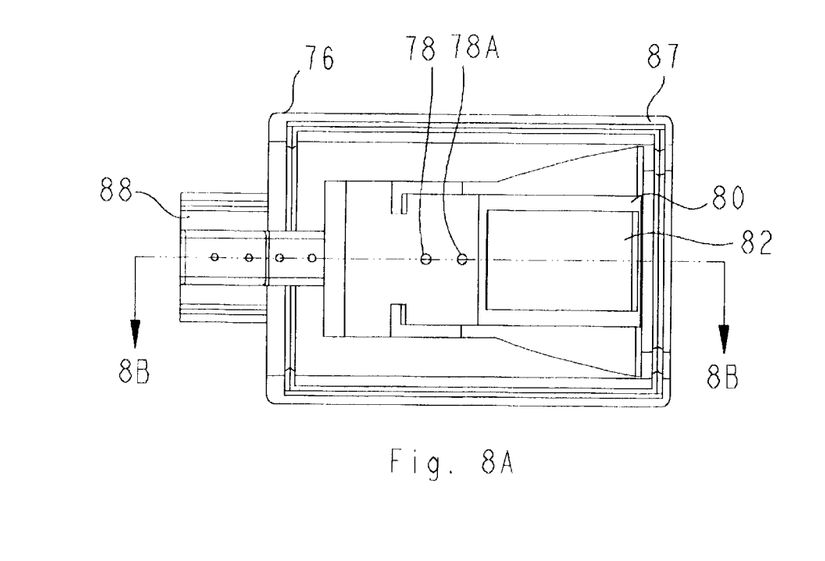
FIGS. 8A–8C show top, side cross-sectional and perspective views, respectively, of a blockage sensor unit cover.
Figure 8B:
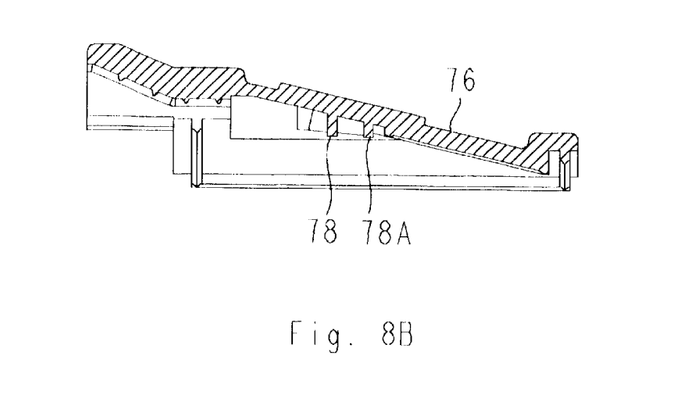

Referring to FIG. 8A, an air gap 82 is designed into the blockage sensor cover 76 directly behind the sensing area of the flexible piezoelectric sensor element 68. This air gap 82 effectively increases the sensitivity of the flexible piezoelectric sensor element 68 (by allowing strain in the flexible piezoelectric sensor element to occur freely) so that even small seeds, such as canola, can create a piezoelectric-effect output from the sensor.

Figure 8C:
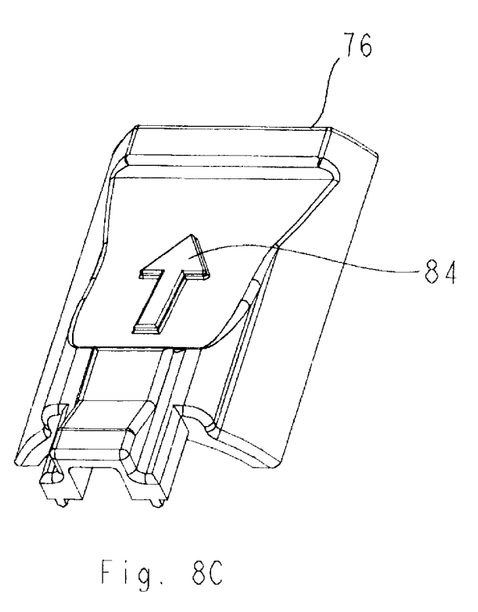
Figure 9A:
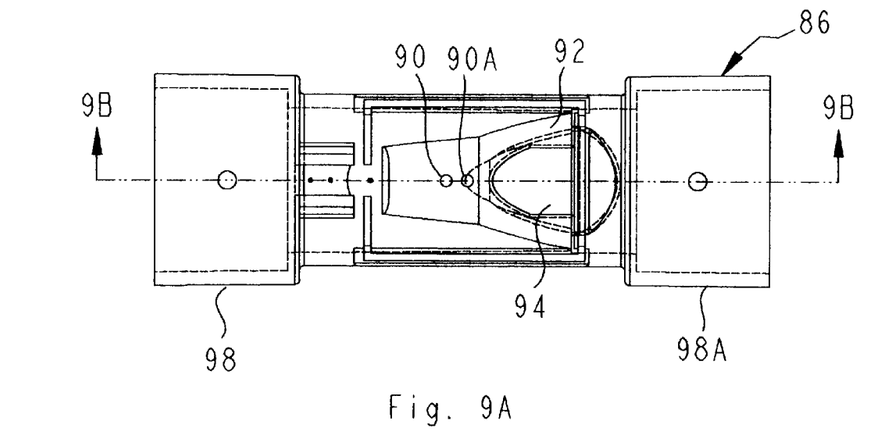
FIGS. 9A and 9B show top and side cross-section views, respectively, of the blockage sensor unit.
Figure 9B:
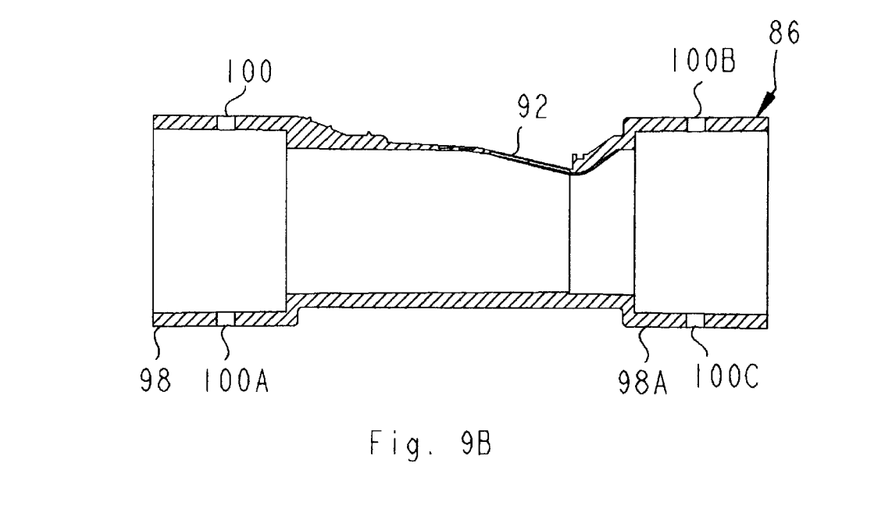

A directional arrow 84 appears in the isometric view of the blockage sensor cover 76 in FIG. 8C. This directional arrow 84 has been added to the design as an aid in correctly placing the blockage sensor unit 56 into the secondary seed tube 48 at the time of installation. The directional arrow 84 is to point following the direction of seed flow from the header 46, through the secondary seed tube 48, to the opener 50. The inner surface edge 87 of the blockage sensor cover 76 has been prepared in such a manner that it can be fitted directly onto a blockage sensor tube 86 (FIG. 9) and welded ultrasonically into place. The blockage sensor cover 76 is designed to include a means of tension relief 88 for the sensor wire cable harnessing 66, which is set in place during the ultrasonic welding operation.

FIGS. 9A and 9B show top and side views, respectively, of the blockage sensor tube 86. The blockage sensor tube 86 can be made of an injection molded thermoplastic such as a polycarbonate/ABS blend. The blockage sensor cover 76 (FIG. 8) is designed such that the pins 78 and 78A fit into corresponding impressions 90 and 90A in the blockage sensor tube 86. In this position, the angle of intrusion α of the intrusion surface 80 upon which the flexible piezoelectric sensor element 68 is fastened matches the angled slope 92, which is inclined at the angle α to a central axis of the secondary seed tube. The sensor area cutout 94 exposes the sensing area of the flexible piezoelectric sensor element 68 to the seeds 32 (FIG. 2) flowing through the secondary seed tube 48. Thus, a small portion of the seeds flowing in the seed flow path strike the flexible piezoelectric sensor.

A combination of factors lead to advantageous results when using the present sensor arranged in the manner illustrated. First, because the impact object is a flexible MYLAR sheet as opposed to an inflexible plate or pin, as in the prior art, the amount of strain induced in the piezoelectric detector for a given seed impact is higher than in the prior art. This results in the piezoelectric sensor being more sensitive, and allows very small seeds, such as canola, to be monitored with the present monitoring system.

Second, the higher sensitivity detector also allows the intrusion angle of the sensor into the flow path to be reduced. This results in only a slight change of momentum for most seeds that strike the flexible MYLAR surface of the sensor, and virtually eliminates any seeds from being damaged. By minimizing the change in momentum needed to detect seed flow, the forward momentum of all the seeds in the seed path is maintained to a greater extent than with prior art systems. Thus seed blockages, caused by the seed blockage sensor being in the path of the seeds, is minimized.

The outer surface edge 96 of the blockage sensor tube 86 (i.e., that which is complementary to the inner surface edge 87 of the blockage sensor cover 76) has been prepared in such a manner that the blockage sensor cover 76 (FIGS. 8A–8C) can be directly welded into place ultrasonically. Both ends of the blockage sensor tube 86 have an increased internal and external diameter in comparison to its center portion. The increase in diameters of the ends conform to the thickness of the secondary seed tube 48, forming acceptors 98 and 98A (FIG. 9A). Ends of the secondary seed tubes 48 are inserted into acceptors 98 and 98A. The portions of the secondary seed tubes 48 and the attached blockage sensor tube 86 that constrain the seeds have identical internal diameters so that a smooth flow path boundary is achieved. Acceptor 98 contains two fastener holes 100, 100A and acceptor 98A contains two fastener holes 100B, 100C. Metal spring clips 102 and 102A (FIG. 5 and FIG. 6), fit into these holes so as to secure the connection of the blockage sensor tube 86 to the secondary seed tube 48.

Figure 10:
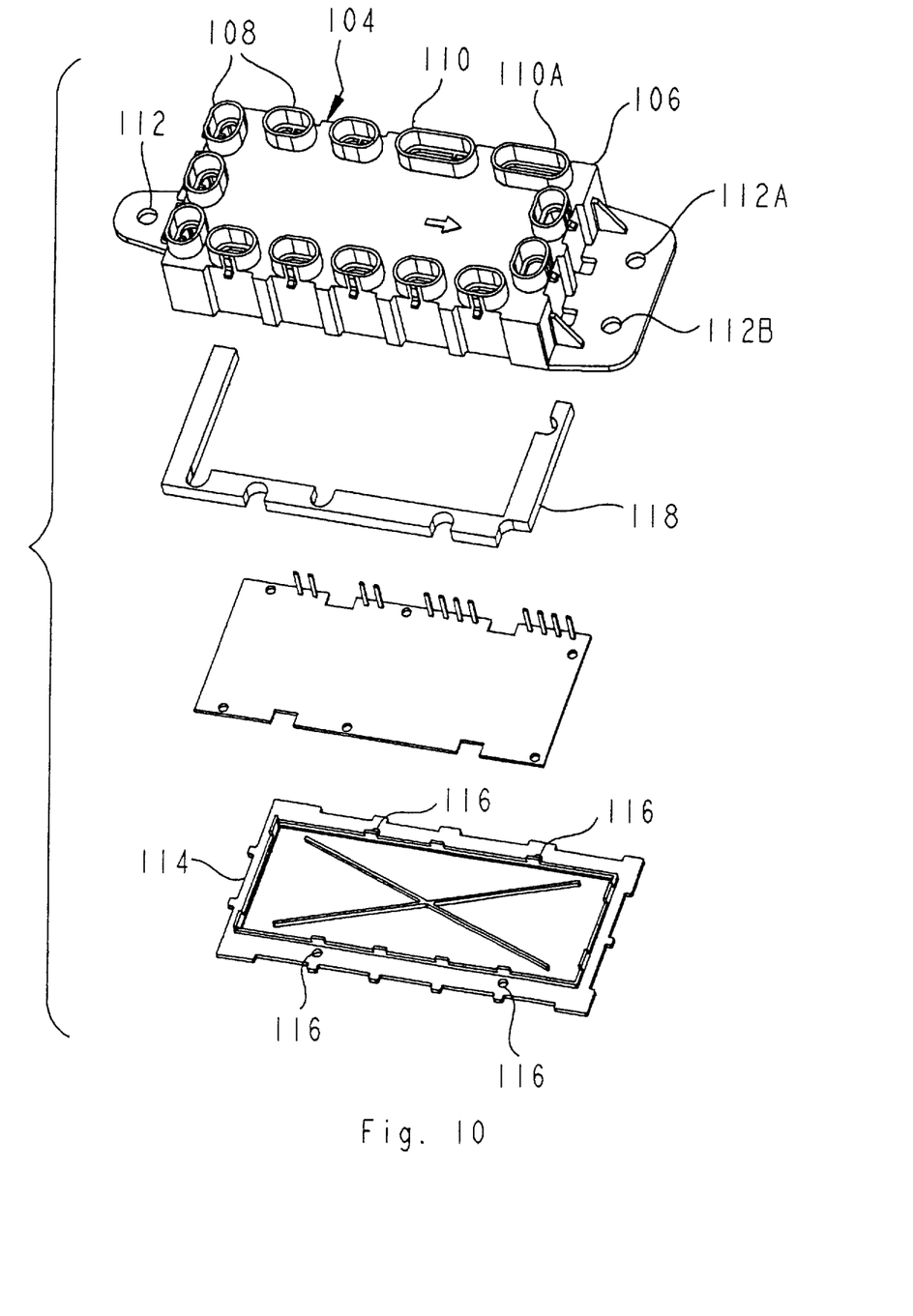
FIG. 10 is an exploded view of a slave unit enclosure.

FIG. 10 shows an exploded view of the preferred embodiment of the slave unit enclosure 104. The slave unit enclosure top 106 can be made of an injection molded thermoplastic such as a polycarbonate/ABS blend. The slave unit enclosure 104 is uniquely designed to house the circuitry and to provide multiple connector ports 108 for the sensor wire cable harnessing 66 (FIG. 6). Two serial interface ports 110 and 110A are designed for serially linking the slave units 64 and for communicating with the blockage monitor unit 54. Three mounting holes 112, 112A, and 112B are provided.

The slave unit enclosure bottom 114 can be made of an injection molded thermoplastic such as a polycarbonate/

ABS blend. Four screw holes 116 are provided for screws to fasten the slave unit enclosure bottom 114 to the slave unit enclosure top 106.

A partial block insert 118 can be made of an open cell urethane with a protective film or of a closed cell urethane. The partial block insert 118 is used to close extraneous connector ports 108 when the circuitry has been depopulated for use in the "partial-run" air seeder blockage monitoring system. Or alternatively, the holes can be plugged by molded plastic using an insert into the molding tool.

Figure 11:
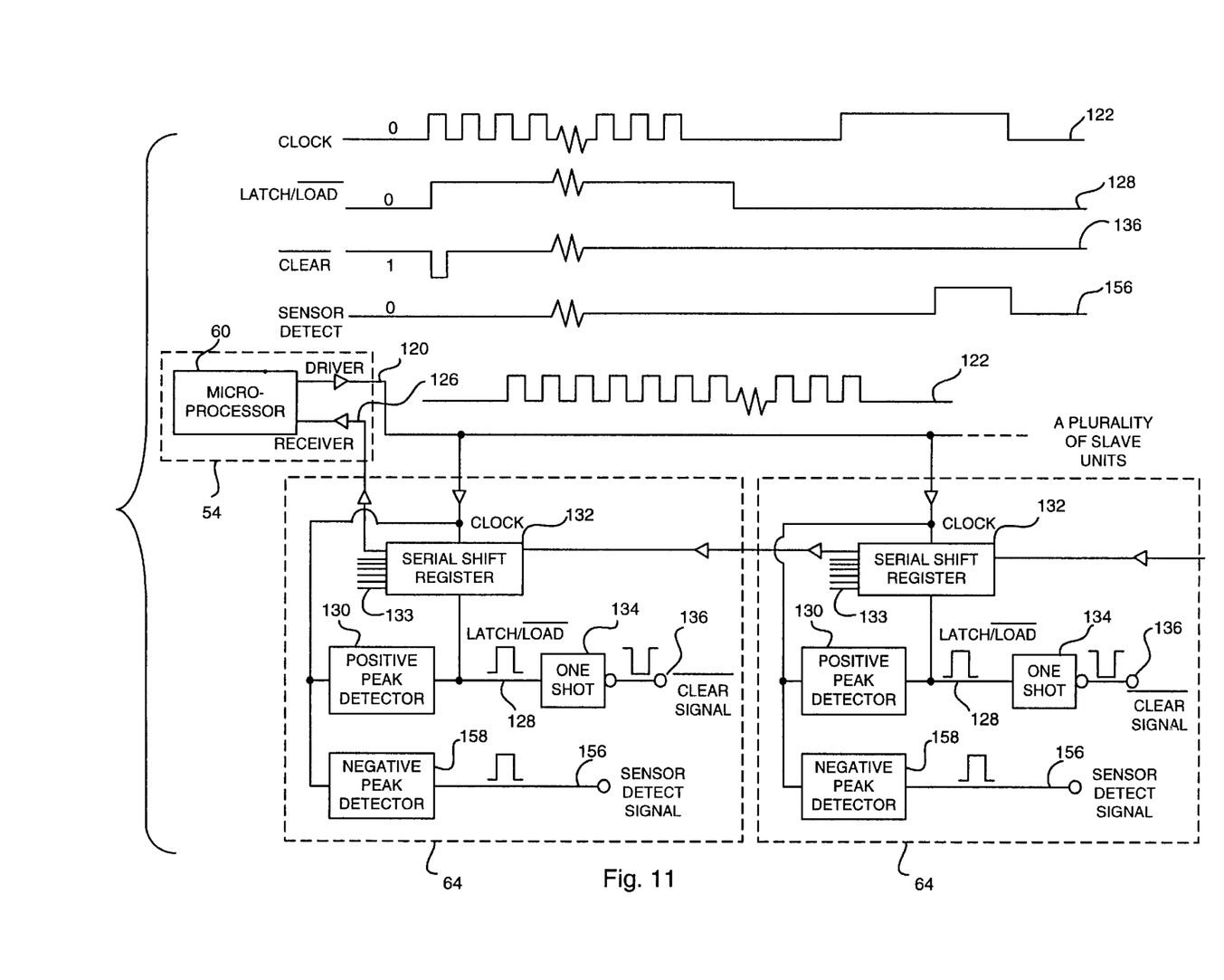
FIG. 11 is a schematic diagram illustrating the circuitry in the various slave units and the connections between the blockage monitoring unit and the various slave units.
Figure 12:
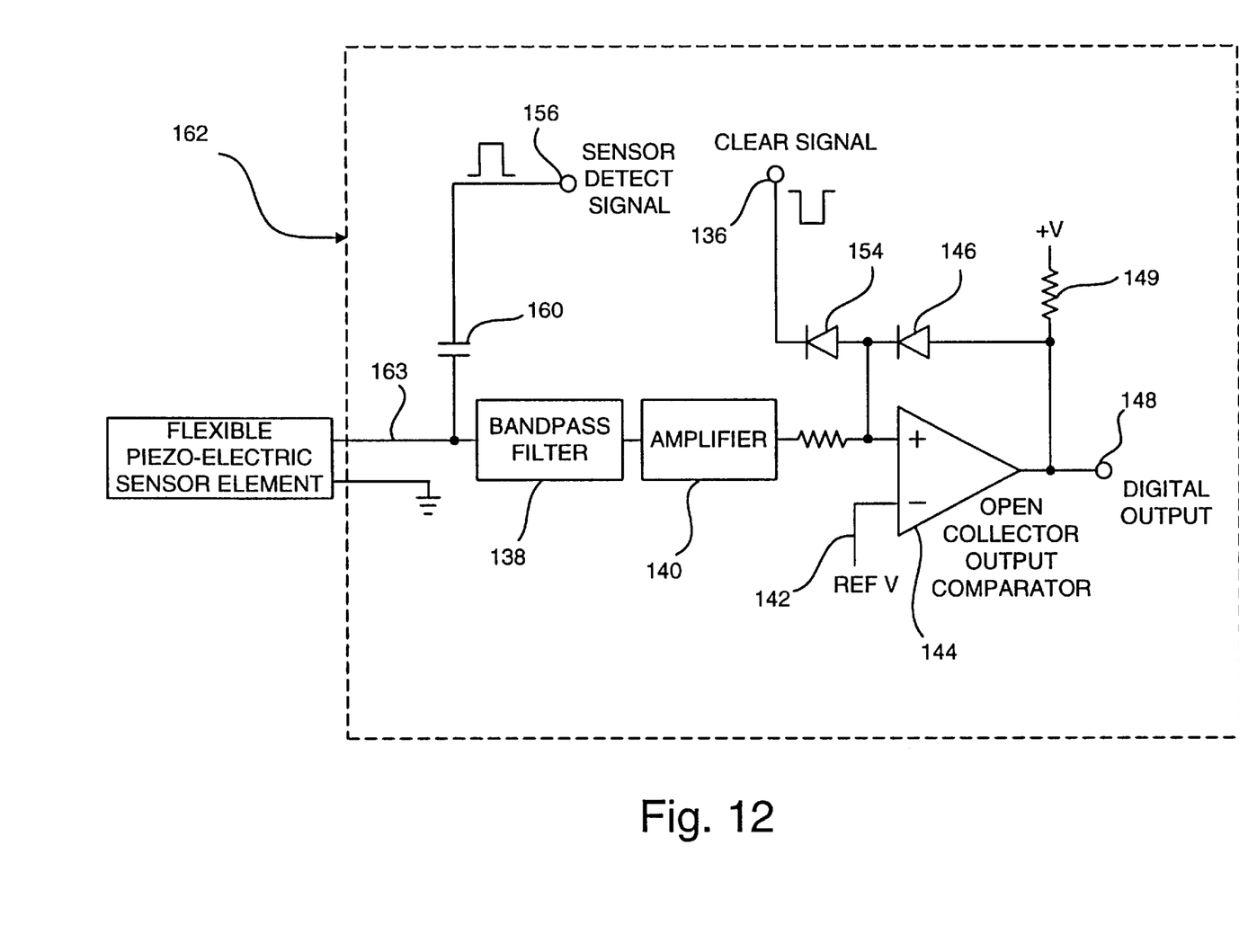
FIG. 12 is a schematic diagram illustrating the circuitry contained in a blockage monitor unit or slave unit to interface to a piezoelectric sensor; and, FIG. 13 is a diagram of one example of framing and input bits that may be used when employing 16 bit, parallel input, serial output, shift registers in accordance with the invention as illustrated in FIG. 11.

FIG. 11 is a schematic diagram illustrating the circuit connections between the blockage monitor unit 54 and various slave units 64. For clarity, FIG. 11 has been simplified, such that only one serial interface link is represented. It is to be understood that other serial interface links may be utilized in the same manner. Each of the serial interface links 62 and 62A (illustrated in FIG. 3) are clocked separately by the microprocessor 60. Although a plurality of slave units 64 are understood to exist, only two slave units 64 are represented in the schematic diagram of FIG. 11, each functioning in the same manner. It is also to be understood that the microprocessor 60 of the blockage monitor unit 54 directly monitors a plurality of blockage sensor units 56 (not shown) through the sensor interface circuit 162 from one header 46.

In FIG. 11, the blockage monitor unit 54 contains the microprocessor 60, (e.g., Siemens C167 series) and associated circuitry. A driver line 120 of a serial interface link is shown exiting the microprocessor. The driver line 120 carries the clock signal 122 to each of the slave units 64. The blockage monitor unit 54 communicates with all of the slave units 64 connected to the driver line 120 via pulses of the clock signal 122. Each slave unit 64 receives the pulses of clock signal 122 in a respective shift register 132 and responds by serially transmitting any stored digital signals in the form of bits back to the blockage monitor unit 54 via the receiver line 126.

Within the driver line 120, the clock signal 122 is used to perform a number of different signaling functions: signaling when the slave unit 64 should capture data, when it should clear stored data, and when it should perform sensor detection (see timing diagram at the top of FIG. 11). When the clock signal 122 is driven high, a latch/load signal 128 is created in the latched state by a positive peak detector 130. The high level of the latch/load signal 128 is then detected and held while the clock signal 122 is switching and slightly longer. This latches the bits in the serial shift register 132 so that they aren't cleared during the clock signal 122 shifting. The serial shift register 132 has a plurality of sensor data input lines 133, which receive the digital signal output 148 (see FIG. 12) as bits from the sensor interface circuit 162. In the preferred embodiment, the data from each register that is shifted (in a serial fashion) into the blockage monitor unit 54 consists of up to 12 data input lines 133. A total of 16 bits are shifted to the blockage monitor unit 54 by each slave unit 64, of which 12 data bits are from sensors and the other 4 are framing bits to maintain data integrity.

When the latch/load signal 128 drops to its low level again, it enables the load function so that new data can enter the serial shift register 132. Therefore, the rising (see FIG. 13) edge of the clock signal 122 enables the transition from the open state to the latched state. Also, at the rising edge of the clock signal 122 an active low one shot 134 generates the clear signal 136 that clears the latched comparator 144 to allow new seed events to be captured.

When the clock signal 122 is driven high and held for an extended period of time, the negative peak detector 158 is allowed to time out and drive the sensor detect signal 156 high. This signal is used in the sensor interface circuit 162 to determine which sensors are attached to the slave.

FIG. 12 is a schematic diagram illustrating the circuitry within a blockage monitor unit 54 or slave unit 64 to interface to a piezoelectric sensor. The flexible piezoelectric sensor element 68 generates an analog signal at the occurrence of a seed event. In a preferred embodiment, a bandpass filter 138 and an amplifier 140 are provided, however, these two items can be omitted or their order interchanged. In the preferred embodiment, the analog signal from a sensor first passes through a bandpass filter 138 and than an amplifier 140. Then it is compared to a reference voltage 142. If the analog signal exceeds the level of the reference voltage 142, it will change the state of the output comparator 144 to the open state which is then pulled high by resistor 149. A diode feedback 146 latches the output comparator 144 such that, as soon as the digital signal output 148 trips high, it stays high. The clear signal 136 travels through diode 154 and forces the positive input of the output comparator 144 low in order to enable it again. The clear signal 136 returns high such that, as soon as new seed events are received, the comparator 144 (which serves as a latch) is enabled to capture these events.

The sensor detect signal 156 is used to determine whether a piezoelectric sensor is connected to the sensor interface circuit 162. Sensor detect signal 156 is generated and travels through an impedance, such as a capacitor 160, and into a sensor element interface line 163. If the flexible piezoelectric sensor element 68 is present, it reduces the peak amplitude of the signal input to the comparator 144 sufficiently that it doesn't trip the comparator 144. If the flexible piezoelectric sensor element 68 is not present, then the sensor detect signal 156 will generate a peak voltage at the input to the comparator sufficient to trip and latch the comparator 144 into a high state.

The microprocessor in the blockage monitor unit 54 monitors and tabulates the serial inputs received from the various shift registers 132 of the slave units 64 as well as any inputs received directly from the sensor interface circuitry 162 in the blockage monitor unit 54 so as to obtain the total number of seed events within a given time period for each sensor element 68.

Figure 13:
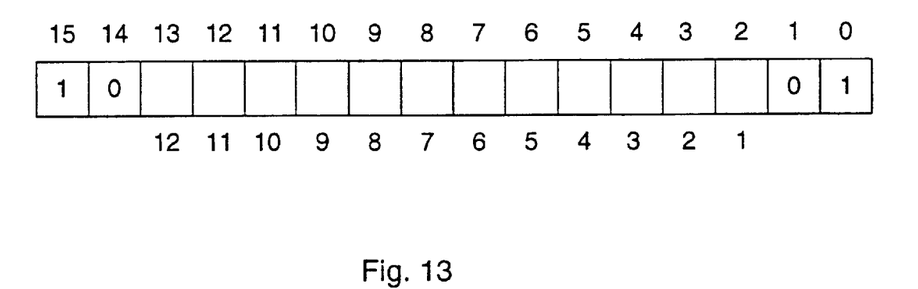

In FIG. 13 is illustrated an example of the framing bits and input bits of a 16 bit, parallel input, serial output, shift register which may be employed as the shift registers 132 in FIG. 11. (Of course, other shift registers, such as ones having 8 or 32 bit parallel inputs, etc., could be used depending on design choice and cost considerations.) In the preferred embodiment, logic 1 framing bits are placed in bit positions 0 and 15 by inputting a logical high to these parallel inputs of the shift register. Also, logic 0 framing bits are placed in bit positions 1 and 14 by inputting a logical low signal to these parallel inputs of the shift register. This allows the microprocessor 60 to positively determine the presence of the data from a slave unit 64. Also, by absence of the framing bits, the absence or failure of a slave unit can be inferred. Of course, these framing bits could also incorporate parity or other check bits to implement error detection or correction. Thus, a 16 bit shift register allows 12 data bits to be placed simultaneously into the register in bit positions 2–13. These data bits can then be clocked into the microprocessor of blockage monitor unit 54 by serial clock pulses 122 at a high rate.

One advantage of the present invention over the prior art is that the rate at which data can be obtained from the piezoelectric sensors is much higher. A high rate of monitoring for seed events in a blockage monitoring system provides additional useful information to the operator besides the occurrence of seed blockages. For example, data as to the relative seed flow rates of the various flow paths can be displayed. In addition, from empirical data (obtained by correlating the number of detected seed events for a given seed type versus the number of seeds that actually flowed through the tube in the same period of time), the seed flow rate can be readily obtained by means of a look-up table, with the inputs being seed type and number of detected seed events per given period of time.

Or, alternatively, if one assumes that the seeds passing through the seed tubes are uniformly distributed, the number of seeds passing through a seed tube can be determined by merely multiplying the detected number of seed events and the inverse of the percent intrusion of the flexible piezoelectric sensor into the seed tube cross-sectional area.

The invention being thus described, it will be obvious that the same may be varied in many ways. Such variations are not to be regarded a departure from the spirit and scope of the invention, and all such modifications as would be obvious to one skilled in the art are intended to be included within the scope of the following claims.

What is claimed is:

1. A seed blockage sensor system comprising:

a seed flow path having a cross-sectional area;

a flexible piezoelectric sensor element having a generally flat surface; and, means to support and align the generally flat surface of said flexible piezoelectric sensor element at an acute angle to the flow direction of seeds in the seed flow path, to thereby cause a portion of seeds flowing in the seed path to impact said flexible piezoelectric sensor element.

2. The seed blockage sensor system of claim 1, wherein the seed flow path cross-sectional area is reduced about seven percent by the flexible piezoelectric sensor element being supported in the seed flow path at an acute angle.

3. The seed blockage sensor system of claim 1, wherein the acute angle is about 13 degrees.

4. The apparatus of claim 1 further including a slave unit connected to said flexible piezoelectric sensor element, said slave unit comprising:

means to output a binary signal, responsive to an analog signal being generated by said flexible piezoelectric sensor element when struck by a seed, indicative of whether a seed has struck the flexible piezoelectric sensor element within a given time period.

5. The apparatus of claim 4, further including a band pass filter and amplifier connected between said flexible piezoelectric sensor element and said means to output a binary signal.

6. The apparatus of claim 1, further including a microprocessor connected to said flexible piezoelectric sensor element for the purpose of monitoring an output thereof.

7. The apparatus of claim 6, wherein a slave unit means, which forms a binary signal indicative of whether a seed has struck said flexible piezoelectric sensor element within a given time period, is connected intermediate said microprocessor and said flexible piezoelectric sensor element in order to increase immunity of the seed blockage monitoring system to noise.

8. The apparatus of claim 6, wherein said microprocessor tabulates the number of seeds detected from each flexible piezoelectric sensor element over multiple data collection periods and determines the number of seeds being planted per unit time in the seed flow path associated with that flexible piezoelectric sensor element.

9. The apparatus of claim 8, wherein said microprocessor tabulates the number of seeds flowing in all or selected ones of multiple seed flow paths and determines the total number of seeds being planted per unit of time.

10. A seed blockage monitor system comprising:

a microprocessor;

one or more seed sensor elements, each having an output;

one or more comparators, each having a positive and negative input and an output, one of said inputs of each comparator being connected to receive a signal representative of the output from a respective seed sensor element;

a shift register having, as at least one data input, a signal output from said one or more comparators; and, means to shift the data in the shift register serially into the microprocessor.

11. The seed blockage monitor of claim 10, wherein said one or more comparators each include a latching means; and wherein the seed blockage monitor system includes means to generate clear signals to reset the comparators to an initial state.

12. The seed blockage monitor system of claim 10, further including a second shift register connected in series to the first-recited shift register, wherein the means to shift data in the first-recited shift register is connected as well to the second shift register so as to also shift data in the second shift register.

13. The seed blockage monitor system of claim 12, wherein data is input to the second shift register via additional comparators connected to respective seed sensor elements.

14. In a seed blockage monitoring system, the combination of a blockage sensor tube having an end of a secondary seed tube inserted therein a short distance, said blockage sensor tube and the secondary seed tube being secured from becoming detached by spring clips which fit into aligned holes in the blockage sensor tube and secondary seed tube.

* * * * *